(12) United States Patent
Grant

(10) Patent No.: US 8,286,996 B2
(45) Date of Patent: Oct. 16, 2012

(54) VEHICLE PROTECTION SYSTEM

(76) Inventor: Norman Grant, Idabel, OK (US)

( * ) Notice: Subject to any disclaimer, the term of this patent is extended or adjusted under 35 U.S.C. 154(b) by 419 days.

(21) Appl. No.: 12/579,171

(22) Filed: Oct. 14, 2009

(65) Prior Publication Data

US 2011/0084508 A1 Apr. 14, 2011

(51) Int. Cl.
*B60R 21/02* (2006.01)
*B60P 3/06* (2006.01)
(52) U.S. Cl. .................. 280/748; 410/3; 410/7
(58) Field of Classification Search .......... 280/727, 280/748; 296/3; 224/403, 404, 405, 412, 224/413, 532, 924; 410/4, 7, 94, 121, 3; 211/19, 20, 85.7; 293/102, 121, 122, 154
See application file for complete search history.

(56) References Cited

U.S. PATENT DOCUMENTS

| | | | |
|---|---|---|---|
| 4,253,785 A * | 3/1981 | Bronstein | 410/110 |
| 4,405,170 A | 9/1983 | Raya | |
| 4,565,402 A * | 1/1986 | Hopkins | 296/3 |
| 4,611,824 A | 9/1986 | McIntosh | |
| 4,867,497 A * | 9/1989 | Jayne | 296/3 |
| 4,921,152 A * | 5/1990 | Kemming | 224/404 |
| 4,953,908 A | 9/1990 | Dondlinger | |
| 5,240,301 A * | 8/1993 | Arnold | 296/39.2 |
| D388,385 S | 12/1997 | Protz, Sr. | |
| 5,904,458 A * | 5/1999 | Bundy | 410/106 |
| 5,975,819 A * | 11/1999 | Cola | 410/129 |
| 6,247,881 B1 * | 6/2001 | Shuen | 410/106 |
| 6,270,301 B1 * | 8/2001 | Dunlop | 410/115 |
| 6,312,202 B1 * | 11/2001 | Benedict | 410/116 |
| 6,350,089 B1 * | 2/2002 | Tekavec | 410/106 |
| 6,398,091 B1 * | 6/2002 | Munoz et al. | 224/402 |
| 6,565,300 B2 * | 5/2003 | Herring | 410/102 |
| 6,746,047 B2 | 6/2004 | Hagen | |
| 6,983,968 B2 | 1/2006 | Brauer et al. | |
| 7,195,432 B2 * | 3/2007 | Earle et al. | 410/94 |
| 7,390,044 B2 * | 6/2008 | Marquez | 296/3 |
| 7,396,046 B2 | 7/2008 | Cole | |
| 7,475,928 B1 | 1/2009 | Clum et al. | |
| 7,736,105 B2 * | 6/2010 | Landry | 410/7 |
| 2003/0011180 A1 | 1/2003 | Coffman et al. | |
| 2009/0123248 A1 * | 5/2009 | Landry | 410/7 |

* cited by examiner

*Primary Examiner* — Joseph Rocca
(74) *Attorney, Agent, or Firm* — Slater & Matsil, L.L.P.

(57) ABSTRACT

A system and method for protecting a vehicle and, more specifically, a truck bed is disclosed. A preferred embodiment comprises a system with three parts: a protective bar, one or more joint pieces attached to the protective bar, and one or more brackets attached to the one or more joint pieces. The brackets fit over the back end of the truck bed to hold the protective bar in place, while still keeping the overall system easily removable from the truck bed. Embodiments include both a single bracket as well as multiple brackets. The protective bar prevents cargo from impacting the front of the truck bed or back window while the cargo is being loaded, unloaded, or transported.

14 Claims, 4 Drawing Sheets

VEHICLE PROTECTION SYSTEM

TECHNICAL FIELD

The present invention relates generally to a system and method for protecting vehicles and, more particularly, to a system and method for protecting the bed and back window of a truck.

BACKGROUND

Generally, the bed of a truck is suitable for holding and transporting cargo and even other, smaller vehicles such as all-terrain vehicles (ATVs). However, while the bed is suitable for holding and transporting items, the bed has very few methods of protecting the actual truck itself from damage that may occur during the unloading or loading of such cargo, or from the damage that may occur if the cargo shifts during transport. If the cargo does shift, the cargo can do severe damage to the bed of the truck and even to the back end of the cab of the truck, especially to the fragile back window, which can be easily shattered by shifting cargo.

Many attempts have been made to provide protection to the bed and cab of the truck. So called "headache racks" have been used as a protective cover for the back window of the cab, and generally comprise a series of protective metal slats arranged to stop any cargo from impacting the back window. However, due to their weight, these headache racks must be firmly attached to the truck itself, generally with some type of clamping mechanism in order to secure the headache rack and offer more support during impact. Further, the headache racks offer only limited protection to the bed of the truck, especially to the region of the bed situated directly below the back window of the cab.

As such, what is needed is a new type of protective system for protecting both the back window of the cab along with the corresponding front end of the bed that is easily removable.

SUMMARY OF THE INVENTION

These and other problems are generally solved or circumvented, and technical advantages are generally achieved, by preferred embodiments of the present invention which provide for a vehicle protection system against loading, unloading, or shifting cargo.

In accordance with a preferred embodiment of the present invention, vehicle protection system comprises a protective bar extending in a first direction, and at least one U-shaped bracket. The protective bar is connected to a first leg of the at least one U-shaped bracket.

In accordance with another preferred embodiment of the present invention, a truck protection system comprises a first bracket, the first bracket comprising a front portion, a back portion, and a middle portion, the middle portion joining the front portion and the back portion, the front portion extending away from the middle portion less than the back portion. One or more joint pieces are connected to a front face of the front portion of the first bracket. A protective bar is connected to the one or more joint pieces, the protective bar having a longitudinal axis parallel to the front face of the front portion of the first bracket.

In accordance with yet another preferred embodiment of the present invention, a truck bed protection system comprises a single U-shaped bracket, the single U-shaped bracket comprising a first leg and a second leg extending in a first direction, the first leg extending a shorter distance than the second leg, the first leg and second leg separated a first distance that is long enough to allow the single U-shaped bracket to be placed over a side of a truck bed. One or more joint pieces are connected to the first leg of the U-shaped bracket, and a protective bar is connected to the one or more joint pieces, wherein the single U-shaped bracket, one or more joint pieces, and protective bar are a single piece.

An advantage of a preferred embodiment of the present invention is the protection of a truck bed and back window from cargo that is being loaded, unloaded, or shifting. Additionally, the preferred embodiments allow for an easy installation and removal of the protection system.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a protective system for the bed of a light duty truck during the transport of an all-terrain vehicle (ATV). The invention may also be applied, however, to other protective systems for transporting different types of cargo using different vehicles.

Figure 1:
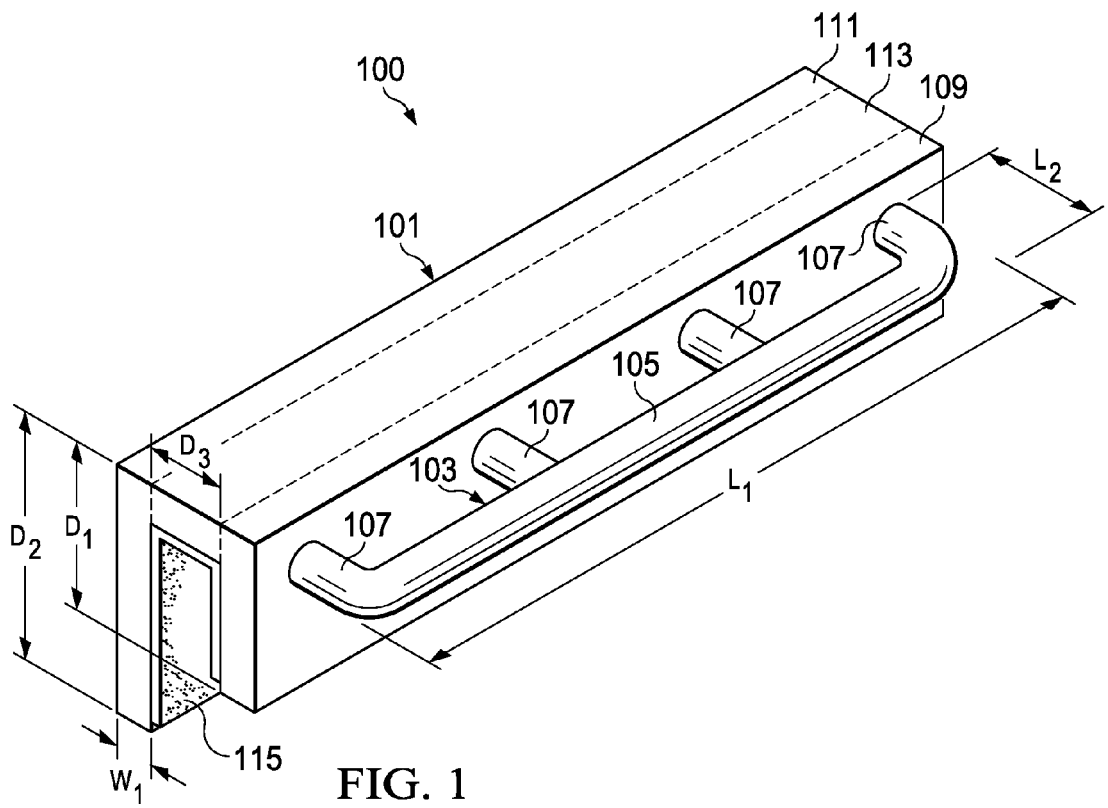
FIG. 1 illustrates a vehicle protection system with a single bracket in accordance with an embodiment of the present invention.
Figure 2A:
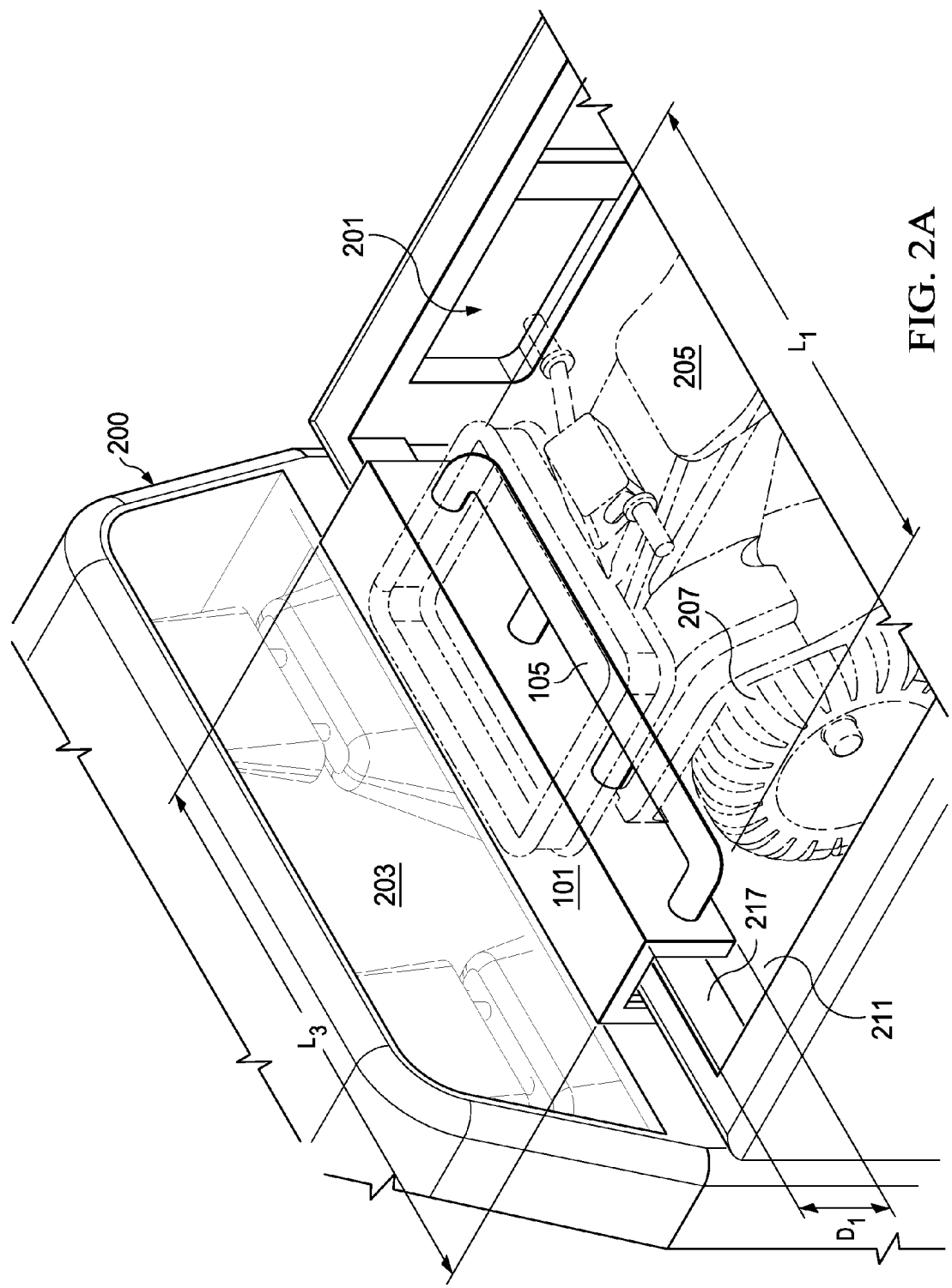
FIGS. 2A-2B illustrate an embodiment of the vehicle protection system positioned in the bed of a truck in accordance with an embodiment of the present invention.
Figure 2B:
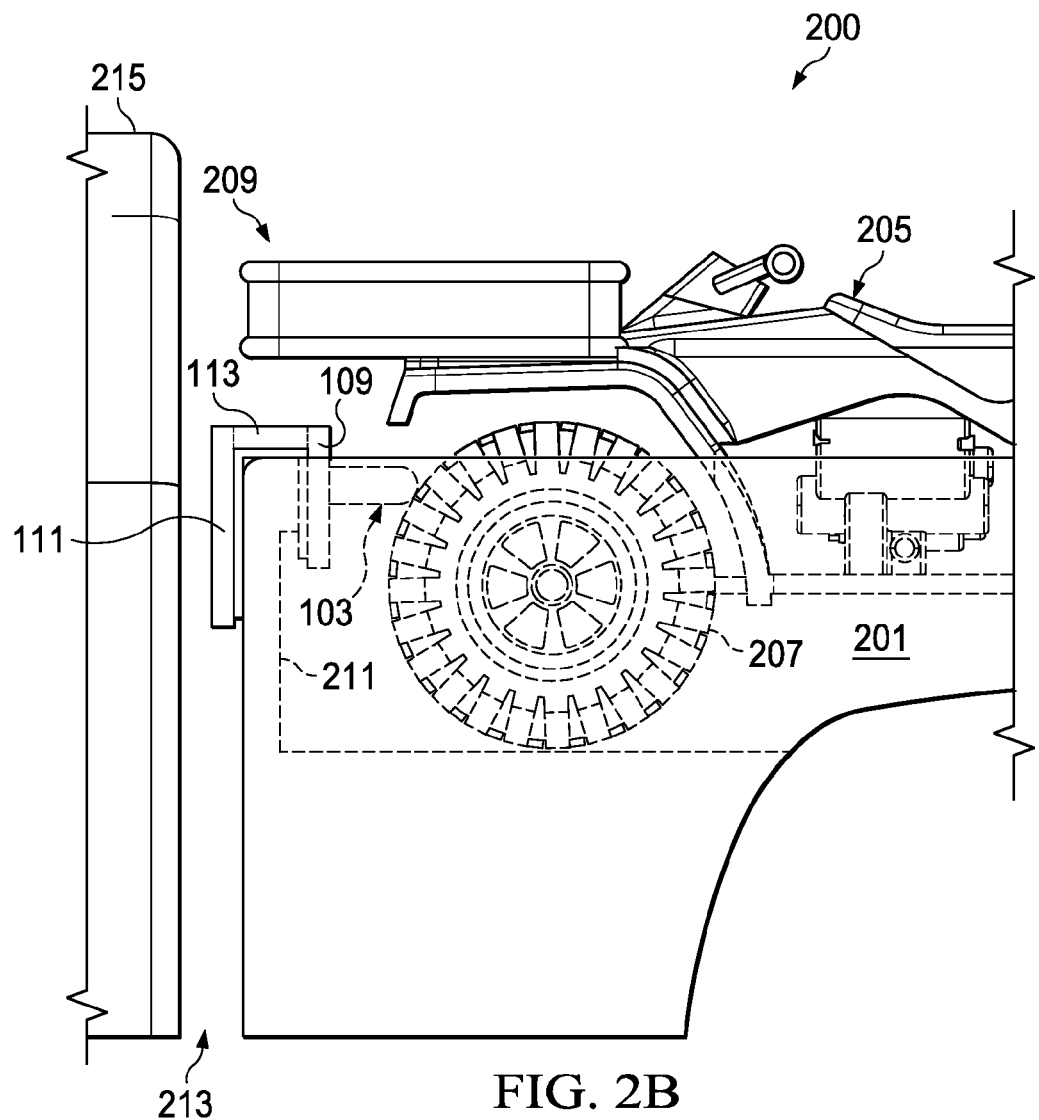

With reference now to FIGS. 1, 2A, and 2B, there is shown an embodiment of a protective system 100 for protecting a bed 201 and a back window 203 of a truck 200. FIG. 1 illustrates the protective system 100 by itself and not installed in the truck 200. FIGS. 2A and 2B illustrate the protective system 100 installed into the bed 201 of the truck 200.

The protective system 100 is designed to prevent or reduce cargo that is being loaded, unloaded, or shifting from moving towards and/or damaging the back window 203 of the truck. This is especially important when the cargo, such as an ATV 205 (represented in FIGS. 2A-2B by the dashed lines), does not have a flat front, and has upper portions (such as the front end 209 of the ATV 205 shown in FIG. 2B) that extend beyond a lower portion (such as the front wheels 207 of the ATV 205 in FIG. 2B) of the cargo. In this case, the lower portion will be stopped by the bed 201 of the truck 200 only after the upper portion has already impacted and potentially damaged the back window 203.

Looking initially at FIG. 1, the protective system 100 in this embodiment preferably comprises two sections: a single bracket 101 and a protective bar 103 attached to the single bracket 101. The protective bar 103 is preferably a bar made of a strong, lightweight material such as plastic that can withstand the impact from shifting cargo or loading cargo into or out of the bed 201 of the truck 200 (see FIGS. 2A-2B). However, plastic is merely one type of material that may be utilized for the manufacture of the protective bar 103, and other materials, such as metal, fiberglass, rubber, aluminum, or even wood, may alternatively be used as long as the material can adequately withstand the impact from shifting and loading cargo.

The protective bar 103 is preferably formed to have a central bar region 105 that has a straight cylindrical shape. The central bar region 105 preferably has a first length $L_1$ that is long enough to contact a significant portion of any cargo that is being loaded or transported without stretching the entire width of the bed 201 of the truck 200 (see FIG. 2A). As such, when the cargo moves towards the front end 211 of the bed 201 and the back window 203, the central bar region 105 is the portion of the protective bar 103 that makes contact with the cargo. For example, when an ATV 205 is being loaded into the bed 201 of the truck 200, the central bar region 105 is preferably long enough to contact at least a portion of both of the front wheels 207 of the ATV 205. As such, while the first length $L_1$ may be modified based upon the particular cargo to be transported, the central bar region 105 may have a first length $L_1$ of between about 8 inches and about 48 inches, such as about two and a half feet.

The central bar region 105 preferably has a cylindrical shape with a diameter of between about 0.25 inches and about 8 inches, such as about 6 inches. However, this shape is merely illustrative and is not meant to limit the present invention. Other suitable shapes for the central bar region 105, such as square, rectangular, hexagonal, octagonal, triangular, combinations of these, or the like may alternatively be used to form the central bar region 105.

The central bar region 105 is preferably connected to the single bracket 101 with one or more joint pieces 107. The joint pieces 107 work to support the central bar region 105 as well as working to transmit the force of impact of the shifting or loading cargo from the central bar region 105 (which makes contact with the shifting or loading cargo) to the single bracket 101 (described further below). As such, the exact number of joint pieces 107 may vary depending upon the support needed for the central bar region 105 along with the support required to withstand the loading, unloading, and shifting of the cargo. As an example only, four joint pieces 107 may be utilized to support the central bar region 105 and to transmit the forces from the cargo to the single bracket 101, although a fewer number, such as two joint pieces 107, may also be utilized.

The joint pieces 107 are preferably arranged to have one joint piece 107 at either end of the central bar region 105, with the remainder of the joint pieces 107 arranged at regular intervals along the central bar region 105. For example, if four joint pieces 107 are utilized, two of the joint pieces 107 may be positioned at the ends of the central bar region 105 while a third joint piece 107 is located one-third of the way along the central bar region 105 and a fourth joint piece located two-thirds of the way along the central bar region 105. However, this is merely an illustrative illustration, and other arrangements of the joint pieces 107 may alternatively be used. For example, if two joint pieces 107 are used, the two joint pieces 107 may be positioned at the ends of the central bar region 105, or else the two joint pieces 107 may each be spaced a third of the length of the central bar region 105. As another example, if a single joint piece 107 is used, the single joint piece 107 may be spaced in the middle of the central bar region 105.

The joint pieces 107 preferably have a second length $L_2$ that extends away from the single bracket 101 a distance that is sufficient to protect the bed 201 and the back window 203 from any protruding aspects of the cargo as it is being loaded (e.g., the front end 209 of the ATV 205, which extends beyond the front tires 207 of the ATV 205). Additionally, the second length $L_2$ should not be so large that the cargo itself will not fit into the bed 201 of the truck 200. As such, while the exact distance of the second length $L_2$ may be dependent at least in part on the type and shape of the cargo to be carried, when the ATV 205, for example, is to be loaded and transported, the second length $L_2$ may be between about 2 inches and about 12 inches, such as about 8 inches, to allow the ATV 205 sufficient room to be loaded into the bed 201 while also preventing the front portion 209 of the ATV 205 from impacting the back window 203 and a front end 211 of the bed 201.

The joint pieces 107 are preferably made from the same material as the central bar region 105 (e.g., plastic, metal, fiberglass, etc.), although the joint pieces 107 may alternatively be made from separate materials than the central bar region 105. Additionally, the joint pieces 107 may be shaped as an extension of the central bar region 105 but positioned so as to join the central bar region 105 to the single bracket 101, such as at a right angle to the central bar region 105. However, this embodiment is meant to be illustrative only, as the shape of the joint pieces 107 may be different from the central bar region 105 and the connections to the central bar region 105 may be at any angle that is appropriate to both support the central bar region 105 and transmit the forces of shifting cargo from the central bar region 105 to the single bracket 101.

The joint pieces 107 connect the central bar region 105 to the single bracket 101. In an embodiment the single bracket 101 comprises a single U-shaped piece with a front piece 109 and a back piece 111 connected by a middle piece 113 (delineated within the single bracket 101 in FIG. 1 by dashed lines). The single bracket 101 provides support to the protective bar 103 as well as receiving the force of impact from cargo and safely dispersing the force to the bed 201 of the truck 200.

The single bracket 101 preferably has a uniform width $W_1$ throughout the front piece 109, back piece 111, and middle piece 113. This uniform width $W_1$ is meant to provide support and stability for the single bracket 101, and, as such, the uniform width $W_1$ is preferably between about ¼ inches and about 3 inches, such as about 2 inches. However, if desired, the front piece 109, back piece 111, and middle piece 113 may alternatively have widths separate from each other. Additionally, the front piece 109 preferably has a third length $L_3$ that is long enough to allow for the connection of the joint pieces 107, and even more preferably at least as long as the first length $L_1$ of the protective bar 103. As such, the third length $L_3$ may extend between about 8 inches, and about 54 inches, such as about 40 inches.

The single bracket 101 is preferably made from the same material as the protective bar 103, such that the single bracket 101 and protective bar 103 may be formed into a single piece for added strength. However, such an embodiment is merely illustrative, as the single bracket 101 may be formed separately from the protective bar 103 and then attached through a suitable method, such as welding, bolting with bolts, gluing with an adhesive, or the like. Any combination of materials and pieces is fully intended to be included within the scope of the present invention.

When installed, the single bracket 101 preferably fits over the front end 211 of the bed 201 of the truck 200, such that the front piece 109 extends into the bed 201 while the back piece 111 extends into a region 213 between the bed 201 and the cab 215 of the truck 200. The middle piece 113 extends between the front piece 109 and the back piece 111 over the front end 211 of the bed 201 of the truck 200 such that the single bracket 101 (and the protective system in general) is supported by the front end 211 of the bed 201 of the truck 200. While the single bracket 101 may be clamped to the bed 201 of the truck 200, the single bracket 101 is preferably not clamped, relying instead on friction to prevent the single bracket 101, and the overall protective system 100, from moving out of place during transport. Not clamping the single bracket 101 has the additional benefit of allowing for a simple installation and removal of the protective system 100 by simply placing or removing the protective system 100 from the bed 201 of the truck 200.

The front piece 109 of the single bracket 101 preferably extends into the bed 201 of the truck 200 from the top of the single bracket 101 a first distance $D_1$ and preferably has a flat front surface. This front surface allows for the connection of the protective bar 103 to the single bracket 101 while allowing the protective bar 103 to extend away from the front end 211 of the bed 201. Additionally, the extension of the front piece 109 of the single bracket 101 into the bed 201 also allows for a larger surface area contact between the front piece 109 of the single bracket 101 and the front end of the bed 201 when cargo impacts the protective bar 103. This enlarged surface area diffuses the impact to a larger area of the front end of the bed 201, thereby reducing the effects and potential damage from the impact. As such, first distance $D_1$ preferably is between about 2 inches and about 8 inches, such as about 6 inches from the top of the front piece 109 of the single bracket 101.

By having the front piece 109 of the single bracket 101 extend into the bed 201 of the truck 200, and having the protective bar 103 attached to the front piece 109 of the single bracket 101, the protective bar 103 is preferably positioned along a top rim 217 of the front end 211 of the bed 201 of the truck 200. This allows the impact from the cargo to be efficiently transmitted from the protective bar 103, through the single bracket 101, and to the top rim 217 of the bed 201 of the truck 200, which allows the top rim 217 to stop shifting cargo before the cargo can damage either the back window 203 or the bed 201 of the truck 200.

The back piece 111 of the single bracket 101 preferably extends into a region 213 between the bed 201 and the cab 215 further than the front piece 109 extends into the bed 201 to allow for greater stability during impact of cargo with the protective bar 103. For example, the back piece 111 preferably extends into the region 213 between the bed 201 and the cab 215 at least one-third further than the first distance $D_1$ that the front piece 109 extends into the bed 201. As such, the back piece 111 preferably extends into the region between the bed 201 and the cab 215 a second distance $D_2$ between about 2 inches and about 8 inches, such as about 8 inches.

However, while the above description is preferable, it is also merely illustrative of one embodiment of the present invention, and should not be viewed as limiting in any respect. Other embodiments may include a back piece 111 that extends into the region 213 between the bed 201 and the cab 215 less than the front piece 109 extends into the bed 201, or even a back piece 111 and a front piece 109 that extend an equal distance. Additionally, while it is preferable that the front piece 109 and back piece 111 run parallel to each other, this is not a requirement, and the front piece 109 and back piece 111 may extend in slightly different directions, if desired, as long as the front piece 109 extends into the bed 201 of the truck 200 and the back piece 111 extends into the region 213 between the bed 201 and the cab 215. Any of these embodiments may be used as long as the back piece 111 provides suitable support for the protective bar 103 during impact.

The middle piece 113 preferably extends between the front piece 109 and the back piece 111 of the single bracket 101 and joins the front piece 109 and the back piece 111 into a single piece. The middle piece 113 preferably allows the single bracket 101 to rest on the front end 211 of the bed 201 of the truck 200. As such, the middle piece 113 should extend between the front piece 109 and the back piece 111 at least a third distance $D_3$ that is at least larger than the width of the front end 211 of the bed 201 of the truck 200. For example, if the front end 211 of the bed 201 of the truck 200 is 1.5 inches wide, then the third distance $D_3$ is preferably between about 1.5 inches and about 4 inches, such as about 2 inches.

The entire protective system 100 is preferably formed as a single piece of molded plastic. This allows for strong connections between the different parts of the protective system (e.g., between the protective bar 103 and the single bracket 101) while also allowing for ease of manufacturing. However, one of ordinary skill in the art will recognize that this is merely one way in which the protective system 100 may be formed. If, for example, the protective bar 103 and the single bracket 101 were to be manufactured from different materials, then they could be manufactured separately and then attached to each other through a suitable process such as welding, bolting, an adhesive, or the like. Any suitable method of forming the protective system 100 may be used as long as the methods used allow the protective system 100 to withstand the eventual impacts from the cargo.

Optionally, padding 115 may be installed along one or more of the interior portions of the single bracket 101 (those portions that will come into contact with the truck bed 201). The padding 115 is intended to cushion and protect the truck bed 201 from the protective system 100, as well as ensure that the protective system 100 remains in place without moving during transport. The padding 115 is preferably formed from rubber that has been formed to fit along the interior portions of the single bracket 101, although any other suitable material, such as foam or Styrofoam, may alternatively be used for the padding 115.

Figure 3A:
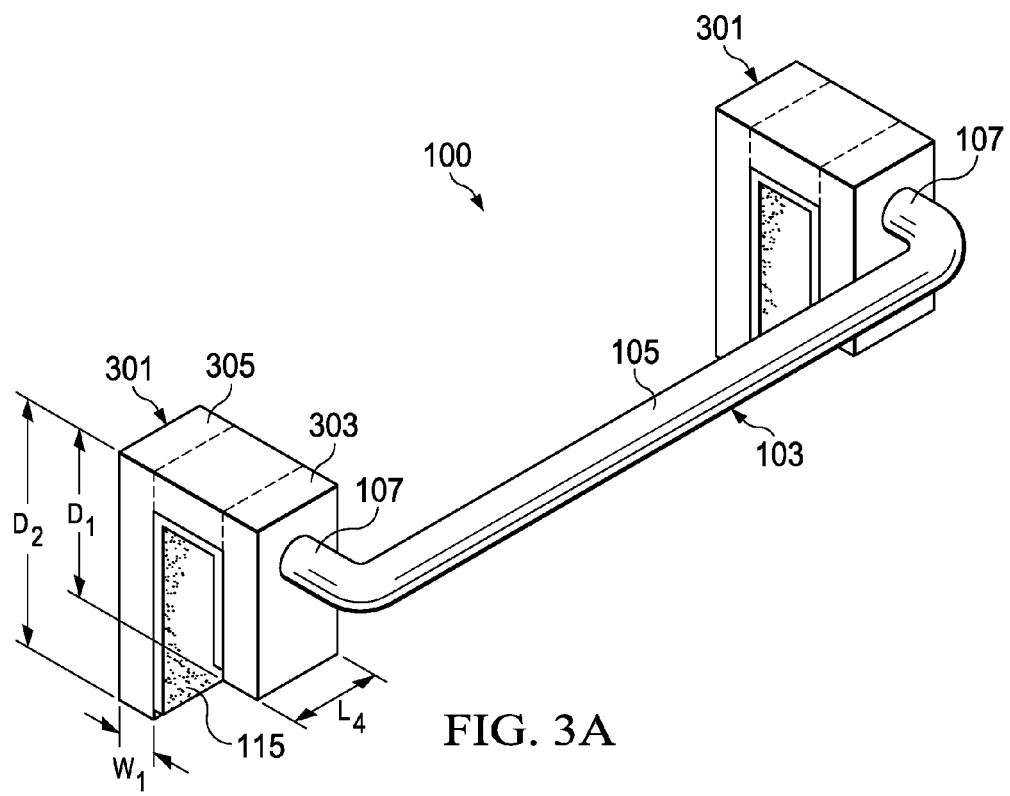
FIG. 3A-3B illustrates a vehicle protection system with multiple brackets in accordance with an embodiment of the present invention.
Figure 3B:
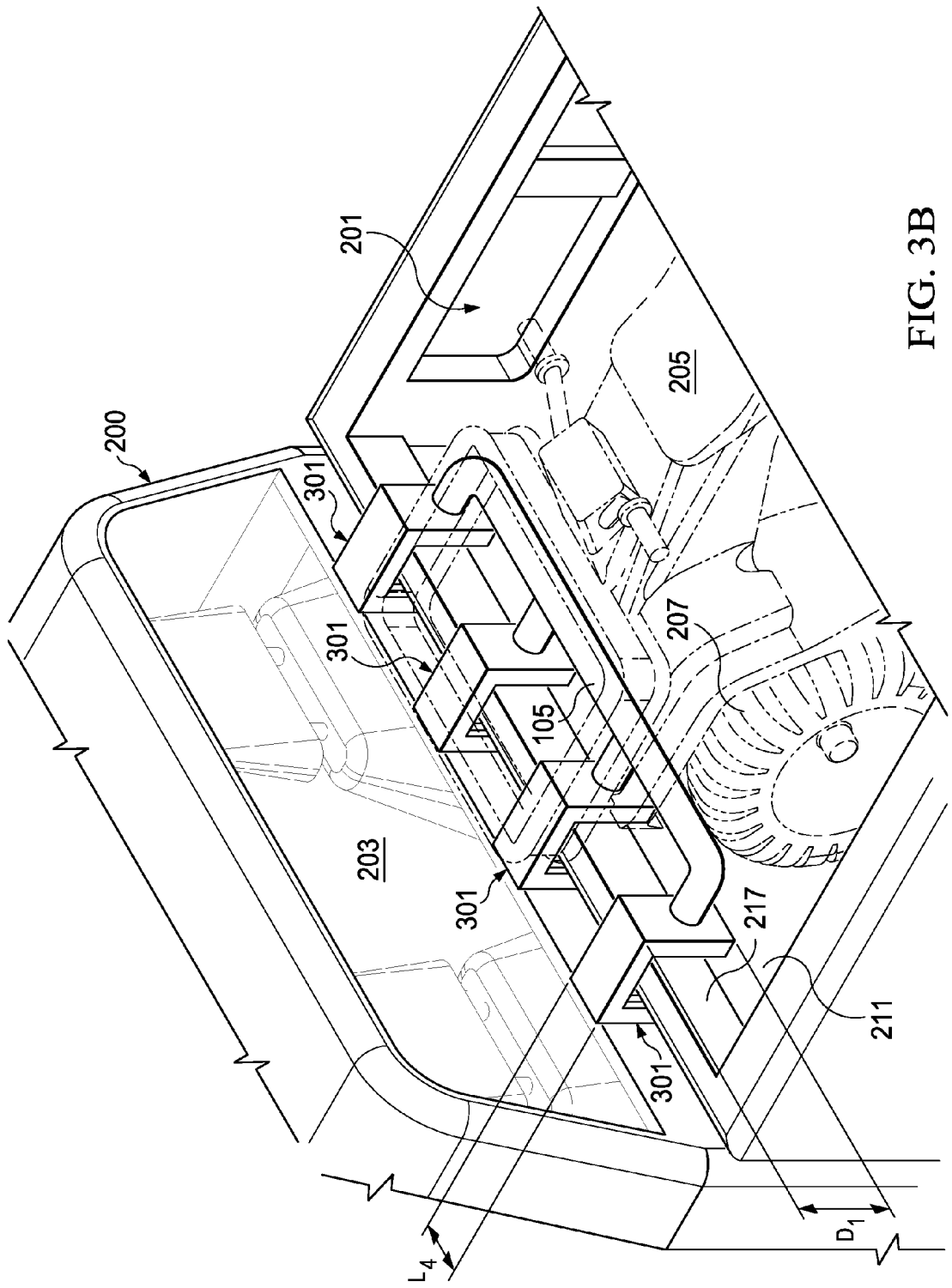

FIGS. 3A-3B illustrate another embodiment of the present invention in which the single bracket 101 (illustrated in FIGS. 1-2B) is replaced by a plurality of brackets 301. In this embodiment the protective bar 103 may be similar to the protective bar 103 described above with respect to FIGS. 1-2B. However, in this embodiment, instead of each of the joint pieces 107 being attached to the same single bracket 101, each of the joint pieces is attached to a separate one of the plurality of brackets 301. For example, if there are two joint pieces 107 as illustrated in FIG. 3A, there would be two of the plurality of brackets 301. Additionally, if there are four joint pieces 107, there would be four of the plurality of brackets 301, as illustrated in FIG. 3B. This allows each of the joint pieces 107 to be supported by at least one of the plurality of brackets 301.

In this embodiment each of the plurality of brackets 301 may have multiple dimensions, such as the width $W_1$, first distance $D_1$, and second distance $D_2$, that are the same as the single bracket 101 described above. For example, each of the plurality of brackets 301 may have a front piece 303 which, when placed onto the truck 200, would extend into the bed 201 of the truck 200 the first distance $D_1$ of between about 2 inches and about 8 inches, such as about 6 inches. Further, each of the plurality of brackets 301 may also have a back piece 305 which, when placed onto the truck 200, would extend into the region 213 between the bed 201 and the cab 215 a second distance $D_2$ of between about 2 inches and about 8 inches, such as about 8 inches.

However, as there are a plurality of brackets 301, each of the plurality of brackets will extend along the direction of the protective bar 103 a shorter length than the second length $L_2$ of the single bracket 101 (see FIG. 1). However, each of the plurality of brackets 301 preferably extends long enough to allow for good support and connectivity to the joint piece 107 to which it is attached. As such, each of the plurality of brackets 301 preferably has a fourth length $L_4$ of between about 1.5 inches and about 6 inches, such as about 4 inches.

In this embodiment, similar to the embodiment discussed above with respect to FIGS. 1-2B, the protective system 100 is preferably manufactured in a single piece from a single material such as a molded plastic. However, each of the plurality of brackets 301 may be made from a separate material than the joint pieces 107 or even each of the other ones of the plurality of brackets 301. If made from separate pieces or materials, the materials are preferably attached to each other through an attachment process such as welding, bolting, an adhesive, or the like.

FIG. 3B illustrates the protective system 100 of this embodiment positioned in the truck 200. As illustrated, the protective system 100 is positioned such that the central bar region 105 is located along the top rim 217 of the bed 201 of the truck 200. As such, when cargo is loaded or unloaded from the bed 201 of the truck 200, or else the cargo shifts during transport, the protective system 100 can prevent the cargo from impacting and potentially damaging the forward portions of the truck 200, including the back window 203.

Although the present invention and its advantages have been described in detail, it should be understood that various changes, substitutions and alterations can be made herein without departing from the spirit and scope of the invention as defined by the appended claims. For example, the number of brackets or materials used may be modified while still remaining within the scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A vehicle protection system comprising:
    a protective bar having a longitudinal axis extending in a first direction; and
    at least two U-shaped brackets that are not clamped and rely upon frictional forces, wherein the protective bar is directly connected to respective back legs of the at least two U-shaped brackets, wherein the protective bar extends perpendicularly away from rear facing surfaces of the respective back legs of the at least two U-shaped brackets, wherein the rear facing surfaces are parallel to the first direction, and wherein each one of the at least two U-shaped brackets further comprises:
    a middle piece extending away from the back leg; and
    a front leg attached to the middle piece and running parallel with the back leg, the front leg extending away from the middle piece a larger distance the back leg.

2. The vehicle protection system of claim 1, wherein the protective bar further comprises:
    a central bar region; and
    one or more joint pieces attaching the central bar region to the at least two U-shaped brackets.

3. The vehicle protection system of claim 1, wherein the at least two U-shaped brackets comprises four separate U-shaped brackets.

4. The vehicle protection system of claim 1, wherein the vehicle protection system is a single continuous piece.

5. The vehicle protection system of claim 1, wherein the front leg extends away from the middle piece at least 25% more than the back leg.

6. The vehicle protection system of claim 1, wherein the at least two U-shaped brackets comprises at least three U-shaped brackets.

7. A truck protection system comprising:
    a first bracket and a second bracket, wherein both the first bracket and the second bracket comprise a front portion, a back portion, and a middle portion, the middle portion joining the front portion and the back portion, the back portion extending away from the middle portion less than the front portion, the back portion comprising a rear face that is facing away from the front portion; portion wherein the first bracket relies upon frictional forces and is not clamped;
    one or more joint pieces directly connected to respective ones of the rear face of the back portion of the first bracket and the second bracket; and
    a protective bar connected to the one or more joint pieces, the protective bar having a longitudinal axis parallel to the rear face of the back portion of the first bracket.

8. The truck protection system of claim 7, further comprising a third bracket and a fourth bracket, wherein the protective bar is connected to each of the third bracket and the fourth bracket through at least one of the one or more joint pieces.

9. The truck protection system of claim 7, wherein the truck protection system is a single continuous piece.

10. The truck protection system of claim 9, wherein the single continuous piece is molded plastic.

11. The truck protection system of claim 7, wherein the first bracket and the one or more joint pieces are joined together through a weld or an adhesive.

12. The truck protection system of claim 7, further comprising padding located on the bracket.

13. The truck protection system of claim 7, wherein the truck protection system contacts only a front side of the truck bed.

14. The truck protection system of claim 7, further comprising a third bracket between the first bracket and the second bracket, the third bracket connected to the protective bar.

* * * * *